United States Patent
Gastineau et al.

(10) Patent No.: US 8,776,938 B2
(45) Date of Patent: Jul. 15, 2014

(54) ACTIVE VIBRATORY CONTROL DEVICE, VEHICLE COMPRISING SUCH A DEVICE AND ACTIVE MOUNTING BASE FOR SUCH A DEVICE

(75) Inventors: Jean-Luc Gastineau, Douy (FR); Pascal Petit, Beaugency (FR); Eric Seminatore, Cloyes sur Loir (FR)

(73) Assignee: Hutchinson, Paris (FR)

( * ) Notice: Subject to any disclaimer, the term of this patent is extended or adjusted under 35 U.S.C. 154(b) by 305 days.

(21) Appl. No.: 13/302,628

(22) Filed: Nov. 22, 2011

(65) Prior Publication Data
US 2012/0132476 A1    May 31, 2012

(30) Foreign Application Priority Data
Nov. 26, 2010    (FR) ...................................... 10 59814

(51) Int. Cl.
*B60K 1/00*    (2006.01)
(52) U.S. Cl.
USPC ......................................................... 180/300
(58) Field of Classification Search
USPC ......... 180/300, 312, 902; 280/5.5; 188/267.2, 188/378, 266.7; 381/71.4, 86; 248/562, 248/636; 267/136, 141, 153
See application file for complete search history.

(56) References Cited

U.S. PATENT DOCUMENTS

| | | | | |
|---|---|---|---|---|
| 4,391,435 A * | 7/1983 | Pham | .................... | 267/140.13 |
| 5,054,752 A * | 10/1991 | Tabata | .................... | 267/140.12 |
| 5,687,948 A * | 11/1997 | Whiteford et al. | .......... | 248/635 |
| 5,954,169 A * | 9/1999 | Jensen | .................... | 188/378 |
| 6,390,223 B1 * | 5/2002 | Savage et al. | .............. | 180/300 |
| 6,672,434 B2 * | 1/2004 | Schnur et al. | ............. | 188/266.7 |
| 7,113,064 B2 | 9/2006 | Loubat et al. | | |
| 8,444,124 B2 * | 5/2013 | Fueki et al. | .............. | 267/140.14 |

FOREIGN PATENT DOCUMENTS

| | | |
|---|---|---|
| DE | 196 21 700 A1 | 5/1996 |
| EP | 0 469 023 B2 | 12/1999 |
| EP | 1 521 352 A1 | 4/2005 |
| FR | 2 860 564 | 1/2003 |
| JP | 60172746 A | 9/1985 |
| WO | WO-2006/097188 | 9/2006 |

OTHER PUBLICATIONS

French Search Report for related French Application No. FR10 59814; report dated Jun. 30, 2011.

\* cited by examiner

*Primary Examiner* — John Walters
*Assistant Examiner* — James Triggs
(74) *Attorney, Agent, or Firm* — Miller, Matthias & Hull LLP

(57) ABSTRACT

An active vibratory control device for a vehicle, comprising a link comprising a link body that extends between first and second articulations intended to be connected one to a vibrating member and the other to a chassis, and a mounting base connected to the second articulation of the link so as to enable the link to pivot with respect to the mounting base, this mounting base being secured to a vibration generator.

9 Claims, 5 Drawing Sheets

US 8,776,938 B2

ACTIVE VIBRATORY CONTROL DEVICE, VEHICLE COMPRISING SUCH A DEVICE AND ACTIVE MOUNTING BASE FOR SUCH A DEVICE

CROSS-REFERENCE TO RELATED APPLICATIONS

This application claims priority under the Paris Convention to the French Patent Application No. 10 59814, filed on Nov. 26, 2010.

FIELD OF THE INVENTION DISCLOSURE

1. Field of the Invention

The present invention relates to active vibratory control devices for vehicles, to the vehicles comprising such devices and to the active mounting bases for such devices.

2. Background of the Disclosure

More particularly, the invention concerns an active vibratory control device for a vehicle, comprising:
- a link comprising a link body that extends between the first and second articulations intended to be connected one to a vibrating member and the other to a chassis;
- a vibration generator adapted to generate vibrations and to transmit them to the chassis.

In the known anti-vibration devices of this type, the vibration generator is generally carried by the body of the link, which has the drawback that the link is made heavier and assists the transmission of vibrations, in particular vertical, from the vibrating member to the chassis. This is because making the link heavier has a tendency to degrade the dynamic balance of the link and to lower the frequency of the vertical vibration modes of the link, so that these vertical vibration modes coincide with the frequency of the vertical excitations due to the vibrating member: in this case, the vertical excitations due to the vibrating member cause phenomena of resonance of the body of the link which, in their turn, give rise to important transmissions of vibrations to the chassis.

SUMMARY OF THE DISCLOSURE

The aim of the present invention is in particular to overcome these drawbacks.

To this end, according to the invention, a vibratory control device of the type in question also comprises a mounting base connected to the second articulation of the link so as to allow pivoting of the link with respect to the mounting base, and in that the vibration generator is secured to the mounting base.

By virtue of these arrangements, it is avoided to make the link heavier, to disturb its dynamic balance and to lower the frequency of its natural modes are avoided. Consequently the body of the link starting to resonate will no longer make of the link a vibration transmission path from the vibrating member to the chassis despite the presence of the vibration generator.

In addition, the invention makes it possible to place the vibration generator directly on the anchoring point of the link at its second articulation, so that the vibration generator is situated directly at the necessary passage point for the vibrations between the link and the element to which the second articulation of the link is fixed (that is to say the chassis or where applicable the vibrating member). Because of this, the vibrations due to the vibration generator can be particularly effective for neutralising the vibrations transmitted from the vibrating member to the chassis by means of the link, and the application of the vibrations due to the vibration generator therefore does not give rise to parasitic torques such as those that may be created when a vibration generator is fixed for example to the chassis at a point offset from the link anchoring point (this is because, in this case, this parasitic torque is generated by the offset between the points of application on the chassis of the vibrations coming from the vibrating member and the vibrations coming from the vibration generator).

It should be noted that the vibrations generated by the vibration generator may be determined:
- so as to attenuate the vibrations coming from the vibrating member, for example as taught for example in the document FR 2860564 or, in another example, by acting so as to minimise the vibrations due to the engine in the vehicle cabin,
- and/or so as to create additional sounds heard inside the cabin and/or outside, for example in order to artificially create a sonority of an engine other than that of the vehicle, as taught for example by the document EP 0469023 or the document WO 2006/097188.

In various embodiments of the vibratory control device according to the invention, one may have recourse optionally also to one and/or other of the following provisions:
- the mounting base comprises a casing containing the vibration generator;
- the mounting base comprises a fixing plate adapted to be fixed to the chassis and at least one connecting member that extends in a first direction from the fixing plate and is connected pivotally to the second articulation of the link, said casing extending in a second direction opposite to the first direction from the fixing plate;
- the mounting base comprises two connecting members in the form of cheeks that extend parallel to each other on either side of the second articulation of the link;
- each of the first and second articulations of the link comprises an elastomer ring interposed between the body of the link and respectively the vibrating member and the chassis;
- the vibration generator is an electrically controlled active beater.

Moreover, another subject matter of the invention is a vehicle comprising a chassis (body or engine cradle in particular) and an engine, connected together by a vibratory control device as defined above, the engine being connected pivotally to the first articulation of the link and the chassis being secured to the mounting base. When the mounting base comprises a casing containing the vibration generator, a fixing plate adapted to be fixed to the chassis and at least one connecting member that extends in a first direction from the fixing plate and is pivotally connected to the second articulation of the link, said casing extending in a second direction opposite to the first direction from the fixing plate, the casing of the mounting base being able to be received in a casing formed in the chassis, the fixing plate being fixed to said chassis.

Finally, another subject matter of the invention is a mounting base adapted to be connected to the second articulation of the link so as to enable the link to pivot with respect to the mounting base, said mounting base being secured to a vibration generator. Optionally, the mounting base comprises a casing containing the vibration generator, a fixing plate adapted to be fixed to the chassis and at least one connecting member that extends in a first direction from the fixing plate and is adapted to be connecting pivotally to the second articulation of the link, said casing extending in a second direction opposite to the first direction from the fixing plate. The mounting base can comprise two fixing members in the form of cheeks that extend parallel to each other on either side of the second articulation of the link.

BRIEF DESCRIPTION OF THE DRAWINGS

Other features and advantages of the invention will emerge during the following description of two of the embodiments thereof, given by way of non-limitative examples, with regard to the accompanying drawings.

In the drawings.

DETAILED DESCRIPTION OF THE DISCLOSURE

In the various figures, the same references designate identical or similar elements.

Figure 1:
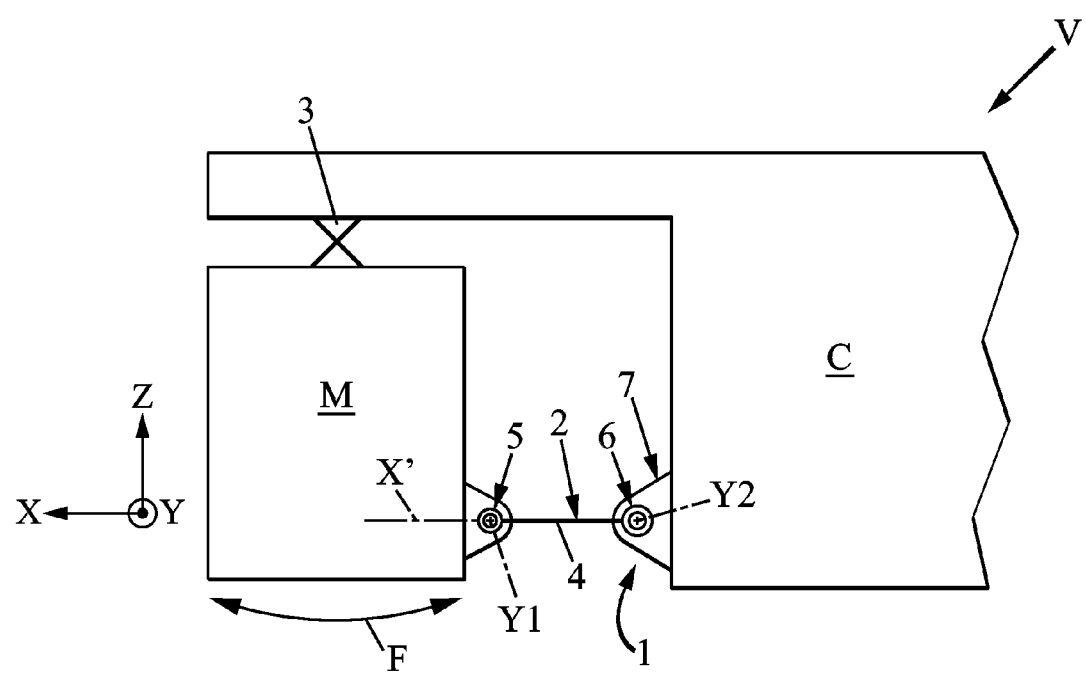
FIG. 1 is a schematic view illustrating an example of use of a vibratory control device according to the invention in a motor vehicle.

FIG. 1 presents an example of application of a vibratory control device 1 for connecting a vibrating member M to a chassis C. The vibrating member M may for example be the engine of a vehicle V and the chassis C is then the body or engine cradle of the vehicle V.

The vibratory control device 1 comprises a link 2 that is shown schematically in FIG. 1, this link 2 constituting for example a torque absorbing link that extends in a direction X' situated in a plane X, Z where X is a horizontal direction and Z the vertical direction.

Conventionally, the link 2 limits the relative movements between the vibrating member M and the chassis C in the direction X, for example when the vibrating member M has a tendency to pivot in the direction of the double arrow F. In the case of the motor vehicle V, the pivoting in question of the vibrating member M may be due to the accelerations and decelerations of the vehicle, the vibrating member M being for example connected to the chassis C by elastic supports 3 that allow said pivoting movement F as well as vertical movements of the vibrating member M in the direction Z.

Figure 2:
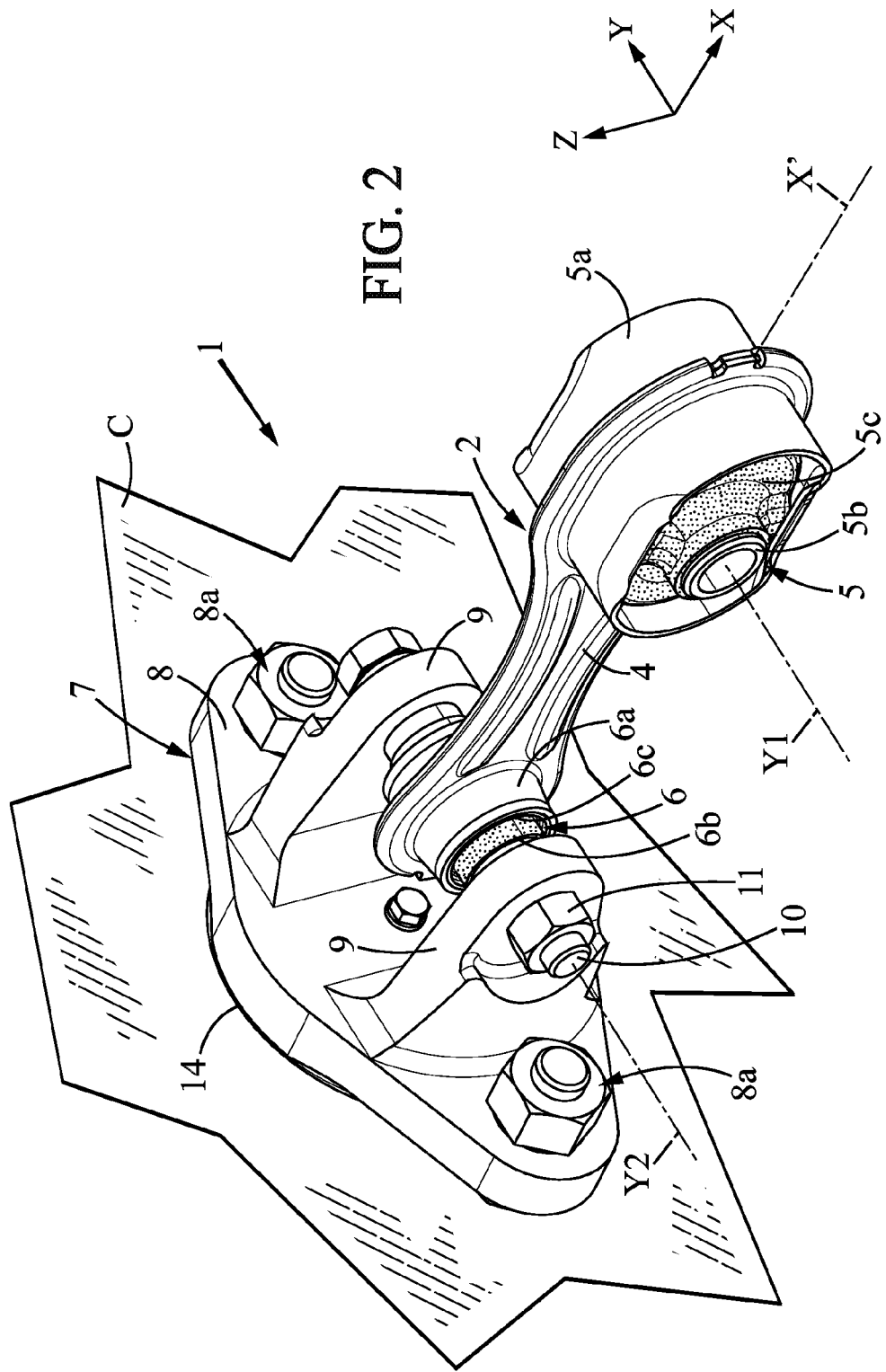
FIG. 2 is a perspective view of the vibratory control device with its mounting base mounted on the chassis of the vehicle.
Figure 3:
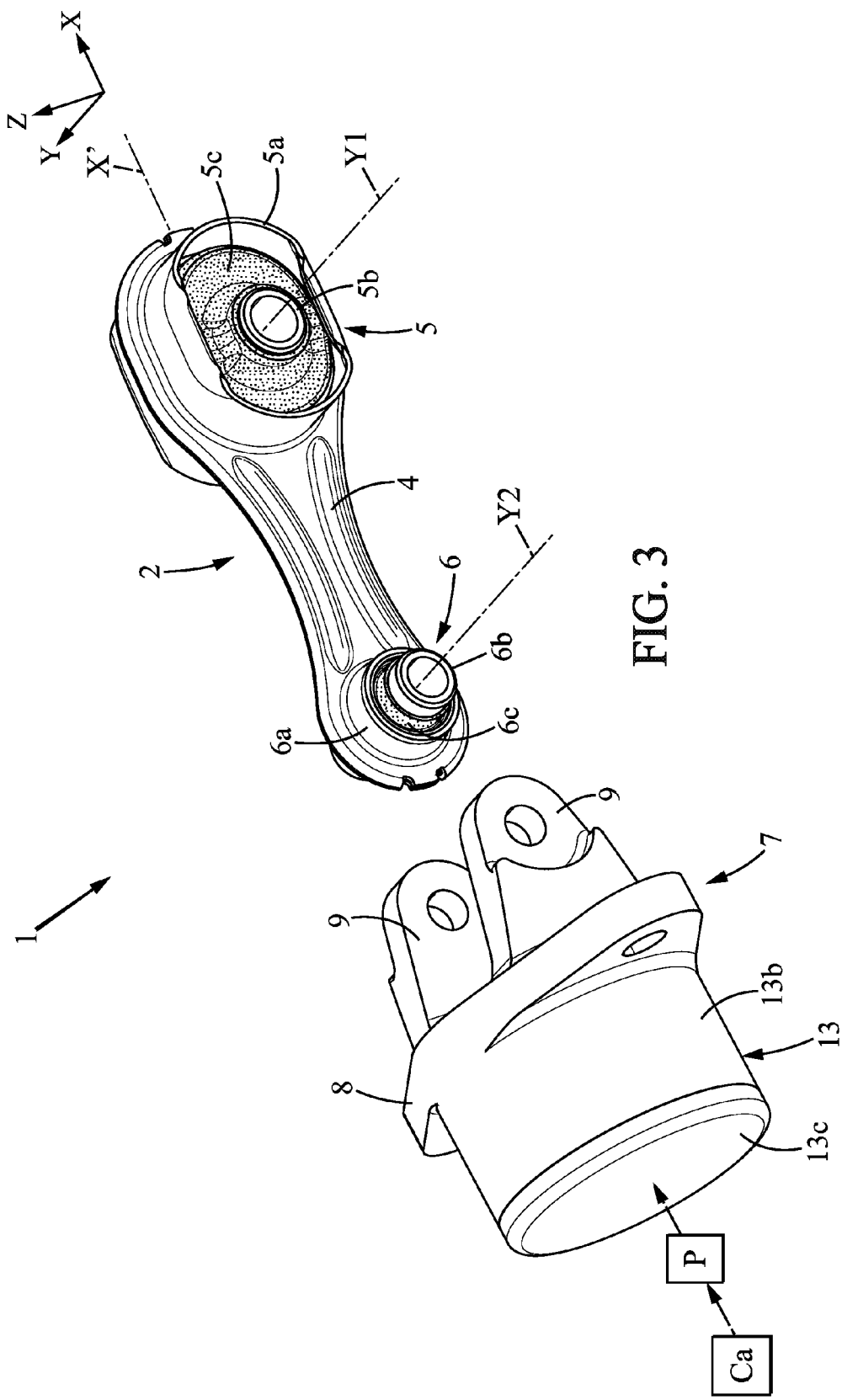
FIG. 3 is an exploded view of the vibratory control device of FIG. 2.
Figure 4:
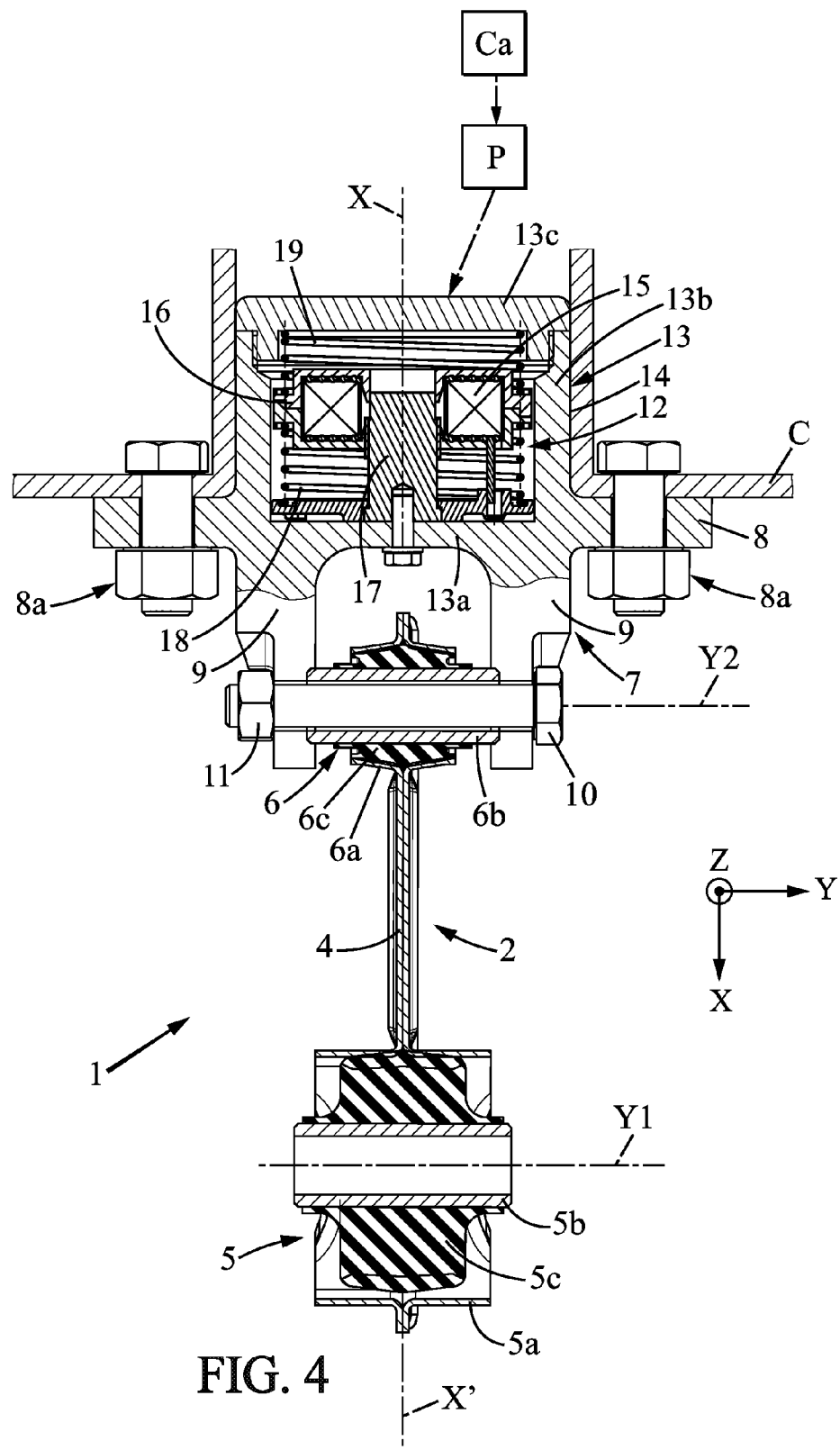
FIG. 4 is a view in longitudinal section of the vibratory control device of FIG. 2, in the first embodiment of the invention.

As shown in more detail in FIGS. 2 to 4, the link 2 comprises a rigid link body 4, produced for example from sheet steel, cast iron, light alloy or plastics material. This link body 4 extends longitudinally in the direction X' between first and second articulations 5, 6.

Each of the articulations 5, 6 may for example comprise:
- a rigid external sleeve, respectively 5a, 6a, secured to the body 4 of the link,
- a rigid internal journal, respectively 5b, 6b, centred on pivot axes Y1, Y2, parallel to the same direction Y, which is perpendicular to the directions X, Z,
- and a flexible elastomer ring, respectively 5c, 6c, disposed inside the sleeve 5a, 6a and surrounding the journal 5b, 6b.

The journal of the first articulation 5 is connected to the vibrating member M so as to allow relative pivoting between the body 4 of the link and the vibrating member M about the pivot axis Y1, while the journal of the second articulation 6 is pivotally connected to a mounting base 7 secured to the chassis C while allowing relative pivoting between the body 4 of the link and the mounting base 7 about the pivot axis Y2 parallel to the axis Y.

The mounting base 7 can consist of any rigid member allowing pivoting mounting of the link 2 on the chassis C.

In the example shown in the figures, this mounting base 7 comprises a fixing plate 8 lying for example in a plane Y, Z and adapted to be fixed to the chassis C, for example by bolts 8a or by any other means.

The mounting base 7 also comprises at least one connecting member 9 that extends in the direction X toward the link 2 and is pivotally connected to the journal of the second articulation 6 of the link. In the example considered here, the mounting base 7 comprises two connecting members 9 in the form of cheeks that extend parallel to each other, each in a plane X, Z on either side of the second articulation 6, these two cheeks 9 being pierced respectively by two holes aligned on the pivot axis Y2 and having a rigid piece passing through them, passing through the journal of the articulation 6 while enabling the link to pivot. This rigid piece consists for example of a screw 10 secured to the cheeks 9 by a nut 11.

Figure 5:
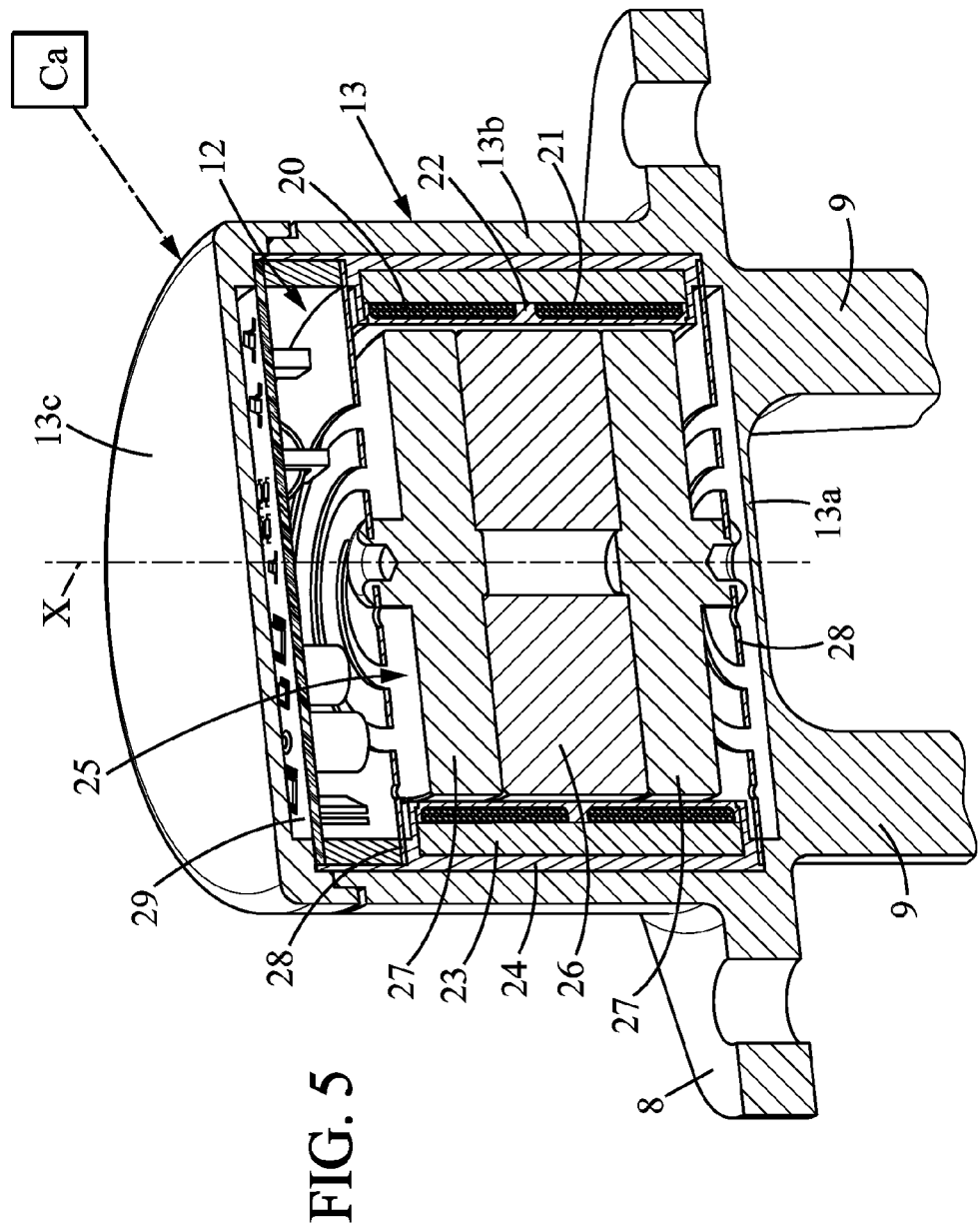
FIG. 5 is a view in longitudinal section of the vibratory control device of FIG. 2, in the second embodiment of the invention.

In addition, the mounting base 7 is mounted rigid with a vibration generator 12 (see FIG. 4) that is adapted to generate vibrations designed so as to attenuate the vibrations coming from the vibrating member M and/or generate supplementary noises imitating for example the noise of an engine other than the engine M. This vibration generator 12 may for example be contained in a casing 13 forming part of the mounting base 7, said casing 13 extending opposite the cheeks 9 from the fixing plate 8. This casing 13 is for example received in a housing 14 provided in the chassis C of the vehicle. As shown in FIGS. 4 and 5, the casing 13 may for example comprise a bottom 13a in line with the plate 8, a cylindrical lateral wall 13b that extends from the bottom 13a as far as an open end, and a cover 13c screwed or otherwise fixed to the open end of the lateral wall 13b.

The vibration generator 12 is preferably an electrically controlled active beater, controlled for example by the computer Ca of the vehicle, in a manner known per se.

This active beater may be controlled in particular so as to generate vibrations:
- adapted to attenuate the vibrations coming from the vibrating member, for example as taught for example in the document FR 2860564 or preferentially by ensuring that the vibrations due to the engine are minimised in the vehicle cabin: the active beater may in this case be controlled in closed loop, according to measurements made for example by a vibration sensor or acoustic sensor (microphone or similar) placed in the vehicle cabin and connected to the computer Ca,
- and/or to create supplementary sounds heard inside the cabin and/or outside, for example in order to create artificially a sonority of an engine other than that of the vehicle, as taught for example by the document EP 0469023 or the document WO 2006/097188.

In the example shown in FIG. 4, the vibration generator 12 may be of the type described in the document EP 1521352, which comprises a coil 15 extending circularly about the axis X, this coil being associated with a magnetically permeably carcass 16 that slides in alternating movements along the axis X on a magnetically permeable armature 17 connected to the mounting base 7. The alternating movements of the coil 15 and carcass 16, which generate the vibrations, are controlled by the aforementioned computer Ca, which determines the electric current passing through the coil 15 and controls said coil for example by means of a power circuit P connected to said coil by a cable (not shown). The coil and carcass 16 are elastically returned to an idle position for example by springs 18, 19 in the example in question.

In the example in FIG. 5, the vibration generator 12 may comprise an electrodynamic actuator that comprises:
- two coils 19, 20 juxtaposed along the axis X in opposition and centred on the axis X of the casing 13, mounted on a carcass 22 produced for example from aluminium or plastics material and housed for example in a magnetic flux guide tube 23 made from steel or the like, this tube 23 being carried by a support piece 24 produced for example from plastics material and moulded onto the tube 23,
- a moving element 25 able to move in alternating translation on the axis X at the centre of the carcass 22, this moving element comprising for example a permanent magnet 26 framed on the axis X by two solid pieces 27 made from steel or the like,
- two springs 28, formed for example by cropped steel plates, respectively connecting the solid pieces 27 to the support piece 24.

In this case, it is the alternating movements of the permanent magnet 26 and of the solid pieces 27 that generate the vibrations sought.

Optionally, as can be seen in FIG. 5 (but this variant may also apply to the embodiment in FIG. 4), the casing 13 may also comprise an electronic circuit 29 controlling the electric beater, comprising for example a power circuit directly controlled by the computer Ca, to which it is connected by a cable (not shown). Optionally, the electronic control circuit 19 may also comprise a microcontroller that determines the amplitude and phase of the movements of the electric beater according to information coming from the aforementioned computer Ca and optionally one or more vibration sensors or acoustic sensors.

The invention claimed is:

1. An active vibratory control device for a vehicle, comprising:
    a link comprising a link body that extends between first and second articulations intended to be connected one to the vibrating member and the other to a chassis,
    a vibration generator adapted for generating vibrations and transmitting them to the chassis,
    wherein said vibratory control device also comprises a mounting base connected to the second articulation of the link so as to enable the link to pivot with respect to the mounting base, and in that the vibration generator is secured to the mounting base.

2. The vibratory control device according to claim 1, in which the mounting base comprises a casing comprising the vibration generator.

3. The vibratory control device according to claim 2, in which the mounting base comprises a fixing plate adapted to be fixed to the chassis and at least one connecting member that extends in a first direction from the fixing plate and is pivotally connected to the second articulation of the link, said casing extending in a second direction opposite to the first direction from the fixing plate.

4. The vibratory control device according to claim 3, in which the mounting base comprises two connecting members in the form of cheeks that extend parallel to each other, on either side of the second articulation of the link.

5. The vibratory control device according to claim 1, in which each of the first and second articulations of the link comprises an elastomer ring interposed between the body of the link and respectively the vibrating member and the chassis.

6. The vibratory control device according to claim 1, in which the vibration generator is an electrically controlled active beater.

7. A vehicle comprising a chassis and an engine connected together by a vibratory control device according to claim 1, the engine being pivotally connected to the first articulation of the link and the chassis being secured to the mounting base.

8. The vehicle according to claim 7, in which the mounting base comprises a casing containing the vibration generator, a fixing plate adapted to be fixed to the chassis and at least one connecting member that extends in a first direction from the fixing plate and is pivotally connected to the second articulation of the link, said casing extending in a second direction opposite to the first direction from the fixing plate, the casing of the mounting base being received in a housing formed in the chassis and the fixing plate being fixed to said chassis.

9. A Mounting base for a vibratory control device according to claim 1, adapted to be connected to the second articulation of the link of the vibratory control device so as to enable the link to pivot with respect to the mounting base, said mounting base being secured to a vibration generator and said mounting base comprising:
    a casing containing the vibration generator,
    a fixing plate adapted to be fixed to a vehicle chassis,
    and at least one connecting member that extends in a first direction from the fixing plate and is adapted to be pivotally connected to the second articulation of the link, said casing extending in a second direction opposite to the first direction from the fixing plate.

* * * * *